US011811656B2

(12) United States Patent
Jindal et al.

(10) Patent No.: US 11,811,656 B2
(45) Date of Patent: Nov. 7, 2023

(54) DIRECT COMMUNICATION BETWEEN ENDPOINTS ACROSS REMOTE SITES

(71) Applicant: VMWARE, INC., Palo Alto, CA (US)

(72) Inventors: Gaurav Jindal, Pune (IN); Neeraj Mantri, Pune (IN); Rasik Jesadiya, Pune (IN); Rajesh Sahu, Pune (IN); Dibakar Swain, Pune (IN)

(73) Assignee: VMWARE, INC., Palo Alto, CA (US)

( * ) Notice: Subject to any disclaimer, the term of this patent is extended or adjusted under 35 U.S.C. 154(b) by 345 days.

(21) Appl. No.: 17/190,480

(22) Filed: Mar. 3, 2021

(65) Prior Publication Data

US 2022/0231944 A1 Jul. 21, 2022

(30) Foreign Application Priority Data

Jan. 15, 2021 (IN) .............................. 202141002006

(51) Int. Cl.
*H04L 45/74* (2022.01)
*H04L 12/66* (2006.01)
*G06F 9/455* (2018.01)
*H04L 9/40* (2022.01)
*H04L 61/2503* (2022.01)

(52) U.S. Cl.
CPC .......... *H04L 45/74* (2013.01); *G06F 9/45558* (2013.01); *H04L 12/66* (2013.01); *H04L 61/2503* (2013.01); *H04L 63/029* (2013.01); *G06F 2009/45595* (2013.01)

(58) Field of Classification Search
CPC ..... H04L 12/66; H04L 45/74; H04L 61/2503; H04L 62/2514; H04L 63/029; G06F 9/45558; G06F 2009/45595
See application file for complete search history.

(56) References Cited

U.S. PATENT DOCUMENTS

| 9,497,106 B2 | 11/2016 | Khanal et al. |
| 2003/0018814 A1* | 1/2003 | Kao .................... H04L 61/2564 709/245 |
| 2017/0228539 A1* | 8/2017 | Nagafuchi .............. H04L 41/40 |
| 2019/0222559 A1 | 7/2019 | Wang et al. |

FOREIGN PATENT DOCUMENTS

CN 110113243 A 8/2019

* cited by examiner

*Primary Examiner* — Hoon J Chung
(74) *Attorney, Agent, or Firm* — Patterson + Sheridan, LLP

(57) ABSTRACT

A method for direct communication between a source endpoint executing in a first datacenter and a destination endpoint executing in a second datacenter. The method receives, at a gateway of the second datacenter, a packet sent by the source endpoint, the packet having a header that includes a source IP address corresponding to a public IP address of the first datacenter, a destination IP address corresponding to a public IP address of the second datacenter, and source and destination port numbers. The method performs a DNAT process on the packet to replace at least the destination IP address in the header with a private IP address of the destination endpoint. The DNAT process identifies the private IP address by mapping the source and destination port numbers to the private IP address of the destination endpoint. The method then transmits the packet to the destination endpoint in the second datacenter.

17 Claims, 5 Drawing Sheets

DIRECT COMMUNICATION BETWEEN ENDPOINTS ACROSS REMOTE SITES

RELATED APPLICATIONS

Benefit is claimed under 35 U.S.C. 119(a)-(d) to Foreign Application Serial No. 202141002006 filed in India entitled "DIRECT COMMUNICATION BETWEEN ENDPOINTS ACROSS REMOTE SITES", on Jan. 15, 2021, by VMware, Inc., which is herein incorporated in its entirety by reference for all purposes.

BACKGROUND

Software defined networking (SDN) comprises a plurality of host machines in communication over a physical network infrastructure, each host machine including one or more virtualized endpoints, such as virtual machines (VMs), that are connected to, for example, logical overlay network(s) implemented by hypervisors of the host machines on the underlying physical network infrastructure, or are directly addressable on the underlying physical network. The rapid growth of network virtualization has led to an increase in large scale software defined datacenters (SDDCs). Applications of a tenant (or client) of an SDDC execute in the VMs or other types of virtual computing instances (VCIs), such as containers, and communicate with each other over one or more networks. An application may also communicate with other applications, or other parts of the same application, that reside in other remote sites (e.g., in different geographic locations). For example, an application running in an on-premise datacenter may need to access a corporate intranet resource which is running on a server located behind a firewall of the on-premise datacenter in a different physical network from the computer hosting the application. As another example, in a multi-tier (e.g., application-tier, web-tier, database-tier, etc.) application, one tier (e.g., web-tier) of the application executing in a VCI of one datacenter may establish a direct communication with another tier (e.g., database-tier) of the application that executes in a VCI of another datacenter (e.g., located in a different geographical area).

The endpoints (e.g., VMs, containers, etc.) on which different applications, or different portions of an application, execute, may communicate over a virtual private network (VPN), for example, using an Internet protocol (IP) security (IPSec) protocol in order to protect data that is exchanged between the endpoints. For example, an endpoint residing in one datacenter may use an IPSec VPN channel established between the endpoint and another endpoint (e.g., in a remote site) to securely communicate with the other endpoint. Another approach for having endpoint to endpoint communication across remote sites may use a predetermined route using, for example, a multi-protocol label switching (MPLS) to create a type of VPN mechanism (e.g., layer 2 (L2) or layer 3 (L3) VPN). In yet another approach for direct communication between two endpoints, a public IP address may be allocated to one or both of the endpoints, such that the endpoints may communicate over one or more public channels using the public IP address(es).

All of the above-described conventional approaches used for endpoint to endpoint communication across remote sites have their own shortcomings. For example, direct communications over an IPSec VPN channel or using an MPLS based L3VPN mechanism requires heavy load of data and processing on one or both of the gateways of datacenter(s), which may substantially reduce performance efficiency in the gateway(s). Additionally, using IPSec VPN or MPLS based VPN is not highly scalable in most deployment scenarios. Furthermore, allocating public IP addresses (e.g., to one or both of the endpoints) requires heavy consumption of public IP addresses as the number of endpoints increases, which is not desirable.

SUMMARY

Herein described are one or more embodiments of a method for direct communication between a source endpoint executing in a first datacenter and a destination endpoint executing in a second datacenter. The method includes receiving, at a gateway of the second datacenter, a packet sent by the source endpoint in the first datacenter, the packet having a header comprising at least a source internet protocol (IP) address corresponding to a public IP address of the first datacenter, a destination IP address corresponding to a public IP address of the second datacenter, and source and destination port numbers. The method also includes performing, at the gateway of the second datacenter, a destination network address translation (DNAT) process on the packet to replace at least the destination IP address in the header with a private IP address of the destination endpoint, wherein the DNAT process identifies the private IP address of the destination endpoint by mapping at least the source and destination port numbers in the header to the private IP address of the destination endpoint. The method further includes transmitting the packet to the destination endpoint in the second datacenter based on the private IP address of the destination endpoint inserted in the header.

Also described herein are embodiments of a non-transitory computer readable medium comprising instructions to be executed in a computer system, wherein the instructions when executed in the computer system perform the method described above for direct communication between a source endpoint executing in a first datacenter and a destination endpoint executing in a second datacenter. For example, the instructions may include code or one or more instructions for performing each step of the method.

Also described herein are embodiments of a computer system, wherein software for the computer system is programmed to execute the method described above for direct communication between a source endpoint executing in a first datacenter and a destination endpoint executing in a second datacenter. For example, the computer system may include a processor coupled to a memory configured to perform each step of the method.

Also described herein are embodiments of a computer system comprising various means for executing the various steps of the method described above for direct communication between a source endpoint executing in a first datacenter and a destination endpoint executing in a second datacenter.

DETAILED DESCRIPTION

Figure 1:
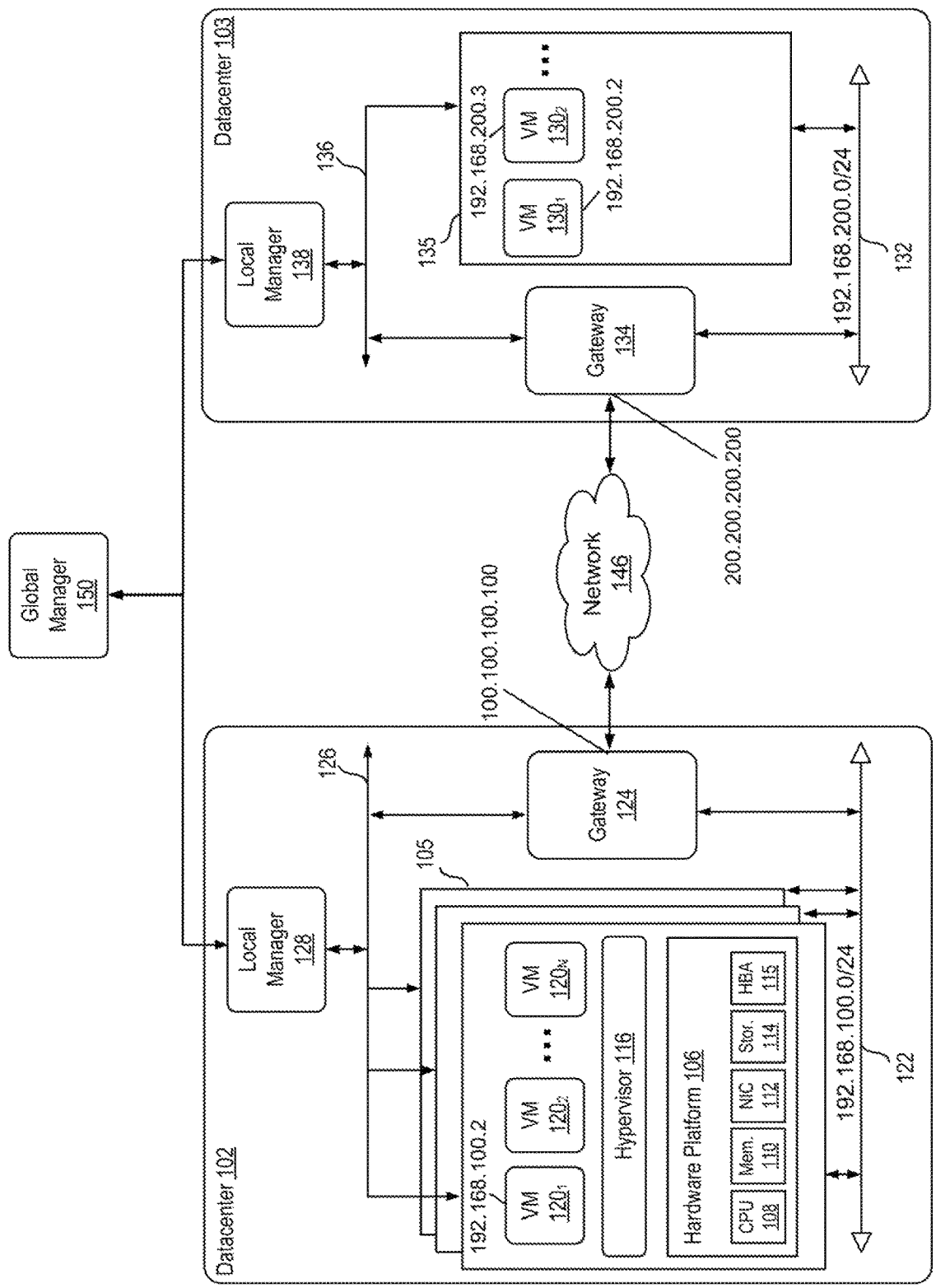
FIG. 1 depicts a block diagram illustrating a communication system in which one or more embodiments of the present application may be utilized.

Direct communication between two endpoints (e.g., two VMs, two containers, etc.) located in different sites, such as in two different datacenters, may involve network address translation (NAT), such as source network address translation (SNAT) and destination network address translation (DNAT). SNAT is a technique for translating source IP addresses and/or source port numbers in packet headers to other IP addresses and/or port numbers (e.g., a public IP address that is accessible by other devices). For example, a gateway residing at the edge of a datacenter (e.g., at the edge of a private network of the datacenter) may convert the IP addresses of packet headers sent from devices in a private network to a public IP address when the packets pass through the gateway to an external network. Similarly, DNAT involves translating destination IP addresses in the headers of packets that are sent to devices in the private network (e.g., from an external network) from a public IP address to the private IP addresses of the devices within the private network.

In other words, a gateway that resides at the network edge of a datacenter may protect the private network devices within the datacenter by performing SNAT and DNAT processes on, respectively, the outgoing (e.g., from the datacenter) and incoming (e.g., into the datacenter) network traffic. By converting private source addresses of the outgoing network traffic to a public address of the datacenter (e.g., a public IP address by which the datacenter is accessed) in an SNAT process, the gateway may prevent exposing addresses of the private network devices that are within the datacenter. The gateway may similarly protect the private network devices that are located within the datacenter by performing a DNAT process on the incoming network traffic to convert the destination address (e.g., the public IP address of the datacenter) in the packet headers of the incoming network traffic to the destination addresses of the individual private network devices within the datacenter.

Accordingly, some embodiments may leverage gateways' SNAT and DNAT processes for establishing a direct communication between two endpoints that are in two different remote sites. For example, a destination gateway of some embodiments, as will be described in more detail below, may perform a particular DNAT on a received packet to identify a destination endpoint for the packet (e.g., a VCI in the destination site) by looking at a source port number in the packet header (e.g., in addition to other tuples, such as destination port number, and in some cases, source and/or destination IP address). The destination gateway may, based on such identification, replace the destination IP address and port number in the packet header with the private IP address and port number of the identified destination EP before sending the packet to the destination EP.

By utilizing the source port number to perform DNAT, unlike conventional DNAT, the same public destination IP address and port number combination can be used to address multiple destination endpoints in the destination datacenter. Accordingly, a unique public destination IP address and port number combination may not need to be assigned to each destination endpoint, thereby reducing the need to use as many public destination IP address and port number combinations, which may be limited. For example, where direct endpoint to endpoint communication is used, each source endpoint may only be communicating with one destination endpoint across the datacenters. Accordingly, if there are two pairs of source and destination endpoints across a pair of datacenters, even if packets from the source datacenter to the destination datacenter utilize the same public destination IP address and port number combination, as long as the public source port number used for the different source endpoints are unique, the DNAT process will be able to send the packets to the correct one of the destination endpoints, as further discussed.

In some embodiments, a global manager may acquire the information needed for establishing such a direct communication between the endpoints from the respective sites of the endpoints. The global manager may then distribute the information acquired from each site to the other site. For example the global manager may configure the gateways and endpoints of the sites with the required information through a local manager of each site. Based on this configuration, a source endpoint of a first site may transmit data (e.g., a flow having one or more packets) directly to a destination endpoint of a second site.

For example, as described in detail below, the source endpoint may transmit a packet to the gateway of the first site. The packet may have a public IP address of the destination site as the destination IP in the packet header. The source gateway may then perform an SNAT process on the packet to change the source IP address and source port number in the packet header before sending the packet to the destination site. For example, the source gateway may change the source IP address in the packet header to the public IP address of the source site and change the source port number to a particular port number (e.g., that is configured at the source gateway by the global manager).

Upon receiving the packet, a gateway of the destination site may perform a DNAT process on the packet to replace the destination IP address and port number in the packet header with the private IP address and port number of the destination endpoint. In some embodiments, the destination gateway may use the source port number in the header as part of identifying the destination endpoint. For example, based on the configuration received from the global manager, the destination gateway may map the source (e.g., and destination) port number(s) to the private IP address and port number of the destination endpoint. As such, another packet that may have a different source port number (e.g., but the same source-destination IP addresses and the same destination port number) may be routed to a different endpoint in the site by the destination gateway. That is, if the SNAT process of the source gateway transmits a first packet (e.g., generated by a first VM of the source site) and a second packet (e.g., generated by the first or a second VM of the source site) to the destination gateway, where the only difference in the packet headers is the source port number, the destination gateway may, based on its configuration and the DNAT process, route the first packet to one destination VM in the destination site and the second packet to another destination VM.

Each one of the remote sites may include a datacenter, such as an on-premise datacenter, public/private cloud, etc.

Each of the endpoints may include any type of a VCI, such as a VM, a container (e.g., a Docker container), isolated user space instances, etc. Although the endpoints are described as VCIs, the described embodiments may equally apply to physical endpoints, such as a desktop computer, a laptop, a tablet, etc. Additionally, an endpoint may include an application or a process running within a VCI (e.g., a container) or within a physical device (e.g., a desktop computer). An endpoint (EP) may refer generally to an originating EP ("source EP") or a terminating EP ("destination EP") of a flow of network packets, which may include one or more data packets passed from the source EP to the destination EP.

Two EPs may communicate with each other, for example, to stretch a network across geographically distant sites. For example, in a multi-tier infrastructure (e.g., a three-tier application), a part of an application in one tier that is located within one site may need to have a direct communication channel with another part of the application in another tier that is located within a remote site in a different geographic area. One site using another site as backup, or during VCI migrations from one site to another, are other examples in which an EP in one site may need to directly communicate with another EP in another site.

The global manager, in some embodiments, may include a physical or virtual server (e.g., a VCI) that resides outside the source and destination sites (e.g., a standalone server, a server that is part of a third site or datacenter, etc.). The information exchanged with the source and destination sites by the global manager, as will be discussed in more detail below, may include a public address (e.g., IP address) associated with each site, a private (or local) address of each endpoint (e.g., local IP address (and port number) of each endpoint) within the site, and other information that may be (optionally) needed to facilitate the communication, such as a maximum transmission unit (MTU) of packets, maximum segment size (MSS) for holding data in each packet, etc. The global manager, in some embodiments, may exchange this information with the gateways of each site through a local manager of the site. For example the global manager may transmit the required data to each local manager of each site, and the local managers may, in turn, configure their corresponding gateways with the received data. In some embodiments, the global manager may, through local managers of the sites, push the information to the endpoint of each site, for example, when the endpoints need to securely communicate to each other (e.g., via an IPSec VPN connection).

As described above, a source EP, in order to directly communicate with a destination EP, may transmit data (e.g., a flow of one or more packets) out of the endpoint toward the destination EP. A flow may refer to a set of one or more packets communicated between the two EPs. A flow may be identified by a five-tuple inserted in each packet's header. The five-tuple may include a source IP address, a destination IP address, a protocol identifier, a source port number, and a destination port number. For example, a set of packets that have the same five-tuple may be part of the same flow. In certain embodiments, a flow may refer to a transport control protocol (TCP) flow or other Layer 4 (L4) flows.

A source endpoint, in some embodiments, may include local IP address and port number of the endpoint as the source IP address and port number in the header of each packet of the flow. The source EP may also include the public IP address of the destination site (e.g., received from a local manager of the source site) as the destination IP of the packet header. The destination port number may, in some embodiments, include a fixed port number, for example, when the packets are encrypted using an IPSec protocol, as described in more detail below. In some other embodiments, the destination port number in the packet header may include a port number associated with the destination EP, or any other port number configured to the EP (e.g., by the local manager) to have this direct communication.

In a source site, as described above, to protect the network devices of the site, the outgoing traffic may have to first pass through a gateway before exiting the site. The gateway may be a physical machine or a VCI residing at the edge of a private network of the source site that performs SNAT and enforces firewall rules, among other operations, on the outgoing packets. Upon receiving the packets from the source EP, for example based on the configuration received from the global manager, the gateway may match the information in a packet header (e.g., the source IP address and source port number) against one or more tables configured at the gateway (e.g., by the global manager). During the SNAT process, the source gateway may, in addition to replacing the source IP address in the packet, replace the source port number in the packet header with a new source port number. The new source port number may be configured at the source gateway by the global manager as corresponding to a specific destination EP. For example, the source port number (e.g., in combination with the destination port number) may also be mapped by a destination gateway to a private IP address and port number of a specific destination EP, as described below.

Similar to the source site, the destination site of some embodiments may have a gateway sitting at the edge of a private network of the destination site that performs DNAT and enforces firewall rules, among other operations, on the incoming network traffic to the site to protect the network devices that are coupled to the private network. After receiving the packets of the flow that are destined for the destination EP, the destination gateway may perform a particular DNAT process on the packets. For example, the destination gateway may identify a private (or local) IP address (and port number) of the destination EP by looking at the source (e.g., and destination) port number in the packet header in some embodiments. For example, the destination gateway may match the source (and destination) port number against one or more tables configured at the destination gateway (e.g., by the global manager). In some embodiments, the gateway may identify the private address of the destination EP by inspecting one or more additional tuples (e.g., in addition to source and destination port numbers) in the packet header. For example, in some embodiments, the destination gateway may inspect source and destination port numbers, as well as the source IP address in the packet header, while in some other embodiments, the gateway may inspect a 4-tuple of the packet header (e.g., source and destination port numbers, as well as source and destination IP addresses) to identify the private address of the destination EP. The DNAT process may then replace the destination IP address and port number in the packet header with the identified destination IP address and port number. After modifying the headers of the flow packets, the destination gateway may send the packets of the flow to their final destination which is the destination EP.

In some embodiments, the source and destination EPs in direct communication may include a pair of containers associated with the same application, or different applications, that need to securely communicate with each other. In some embodiments, a source container may be initiated or running in a source VM that resides in the source site, while a destination container may be initiated or running in a destination VM that resides in a remote destination site. In some embodiments, the global manager may configure (e.g., through local manager of each site) the source and destination VMs with the information required for establishing such a secure channel (e.g., an IPSec VPN channel). For example, the global manager may configure each VM with local and remote IPs of the VMs, local and remote identifications (IDs) of the VMs, as well as other data, such as mutually agreed-upon key and security protocol, and other values/parameters associated with a security association (SA), that are required for an IPSec communication. Each VM may then easily program and start its corresponding container (or containerized application) inside the VM based on the configured data. That is, instead of a user (e.g., an administrator) programming the containers inside the VMs, each VM may automatically program its corresponding container based on the configuration information received from the global manager. Configuring the VMs to start the containers and performing the encryption and decryption of packets by the containers inside the VMs may substantially help in decentralizing the security process, for example, by offloading the process from the gateways to the individual VMs.

As will be described in more detail below, in some embodiments, after the security associations between the source and destination EPs are established, a source EP may enable a feature (e.g., NAT Traversal or NAT-T) of the IPSec protocol to implement a user datagram protocol (UDP) tunneling protocol for transmitting the IPSec packets to the destination EP. That is, the IPSec encrypted packets may be encapsulated by UDP headers to include the source and destination IPs of the respective source and destination EPs. The UDP headers may also include fixed numbers as source and destination port numbers (e.g., port numbers 500/4500). In some such embodiments, when the UDP packets reach the gateway of the source datacenter, the SNAT process may change the source IP address in the UDP header to the public address of the datacenter, and change the source and destination port numbers (e.g., port numbers 500/4500) to new port numbers that are recognizable by a destination gateway of the destination datacenter to perform the DNAT process, as described above.

The above described direct communication between the endpoints not only does not add significant overhead to the gateways of the sites, but also decentralizes processing (e.g., security related processing) from the gateways to the individual VMs, thereby reducing bottlenecks at the gateways. That is, unlike conventional methods of communication that use other mechanisms, such as direct communications over an IPSec VPN channel, or using an MPLS based L3VPN mechanism, the above-described SNAT and DNAT mechanisms do not add significant overhead to one or both of the gateways of datacenter(s). Conversely, unlike allocating public IP addresses (e.g., to one or both of the source and destination endpoints), the above described mechanism reduces the increase in public IP address consumption, for example, as the number of endpoints increases. As such, direct communication between the EPs using the embodiments described above and below is highly scalable.

FIG. 1 depicts a block diagram illustrating a communication system 100 in which one or more embodiments of the present disclosure may be utilized. Communication system 100 includes a datacenter 102 and a datacenter 103 connected to each other through a network 146. Network 146 may be, for example, a direct link, a local area network (LAN), a wide area network (WAN), such as the Internet, another type of network, or a combination of these networks in some embodiments.

Datacenter 102 may include host(s) 105, a local manager 128, a gateway 124, a management network 126, and a data network 122. Datacenter 102 may include additional components (e.g., a disturbed data storage, etc.) that are not shown in the figure. Networks 122, 126, in one embodiment, may each provide Layer 2 or Layer 3 connectivity in accordance with the Open Systems Interconnection (OSI) model, with internal physical or software defined switches and routers (not shown in the figure). Although the management and data network are shown as separate physical networks, it is also possible in some implementations to logically isolate the management network from the data network (e.g., by using different VLAN identifiers).

Each of hosts 105 may be constructed on a server grade hardware platform 106, such as an x86 architecture platform. For example, hosts 105 may be geographically co-located servers on the same rack. It should be noted that datacenter 103 may also include multiple hosts 135 that each may include hypervisor 116 and hardware platform 106, which are not shown in the figure for simplicity of description.

Hardware platform 106 of each host 105 may include components of a computing device, such as one or more central processing units (CPUs) 108, system memory 110, a network interface 112, storage system 114, a host bus adapter (HBA) 115, and other I/O devices, such as, for example, USB interfaces (not shown). Network interface 112 enables host 105 to communicate with other devices via a communication medium, such as data network 122 or management network 126. Network interface 112 may include one or more network adapters, which may also be referred to as network interface cards (NICs). In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical or software defined network, but different network segments, such as different VLAN segments.

Storage system 114 may represent persistent storage devices (e.g., one or more hard disks, flash memory modules, solid state disks, non-volatile memory express (NVMe) drive, and/or optical disks). Storage 114 may be internal to host 105, or may be external to host 105 and shared by a plurality of hosts 105, coupled via HBA 115 or NIC 112, such as over a network. Storage 114 may be a storage area network (SAN) connected to host 105 by way of a distinct storage network (not shown) or via data network 122, e.g., when using iSCSI or FCoE storage protocols. Storage 114 may also be a network-attached storage (NAS) or another network data storage system, which may be accessible via NIC 112.

Host 105 may be configured to provide a virtualization layer, also referred to as a hypervisor 116, that abstracts processor, memory, storage, and networking resources of hardware platform 106 into multiple virtual machines $120_1$ to $120_N$ (collectively referred to as VMs 120 and individually referred to as VM 120) that run concurrently on the same host. Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines.

In some implementations, hypervisor 116 may comprise system level software as well as a "Domain 0" or "Root Partition" virtual machine (not shown) which is a privileged virtual machine that has access to the physical hardware resources of the host and interfaces directly with physical I/O devices using device drivers that reside in the privileged virtual machine. Although the disclosure is described with reference to VMs, the teachings herein also apply to other types of virtual computing instances (VCIs), such as containers, Docker containers, data compute nodes, isolated user space instances, namespace containers, and the like. In certain embodiments, instead of VMs 120, the techniques may be performed using containers that run on host 105 without the use of a hypervisor and without the use of a separate guest operating system running on each container.

Local manager 128 may communicate with hosts 105 via a network, shown as a management network 126, and carry out administrative tasks for datacenter 102, such as managing hosts 105, managing VMs 120 running within each host 105, provisioning VMs, migrating VMs from one host to another host, and load balancing between hosts 105. Local manager 128 may be a computer program that resides and executes in a central server in datacenter 102 or, alternatively, local manager 128 may run as a virtual computing instance (e.g., a VM) in one of the hosts 105. Although shown as a single unit, local manager 128 may be implemented as a distributed or clustered system. That is, local manager 128 may include multiple servers or virtual computing instances that implement management plane functions.

Similar to local manager 128, local manager 138 may communicate with host 135 and other hosts of datacenter 103 (not shown) via a network, shown as a management network 136, and carry out administrative tasks for datacenter 103, such as managing hosts 135, managing VMs 130 running within each host 135, provisioning VMs, migrating VMs from one host to another host, and load balancing between hosts 135. Local manager 138 may be a computer program that resides and executes in a central server in datacenter 103 or, alternatively, local manager 138 may run as a virtual computing instance (e.g., a VM) in one of the hosts 135. Although shown as a single unit, local manager 138 may be implemented as a distributed or clustered system. That is, local manager 138 may include multiple servers or virtual computing instances that implement management plane functions.

Although hosts 105 are shown as including a hypervisor 116 and virtual machines 120, in an embodiment, hosts 105 may include a standard operating system instead of a hypervisor 116, and hosts 105 may not include VMs 120. In such an embodiment, datacenter 102 may not include Local manager 128.

Gateway 124 may provide hosts 105, VMs 120, and other components in datacenter 102 with connectivity to one or more networks used to communicate with one or more remote datacenters, such as datacenter 103. Gateway 124 may manage external public Internet Protocol (IP) addresses for VMs 120 and route traffic incoming to and outgoing from datacenter 102 and provide networking services, such as firewalls, network address translation (NAT), dynamic host configuration protocol (DHCP), and load balancing. Gateway 124 may use data network 122 to transmit data network packets to hosts 105 or receive data packets from hosts 105 in some embodiments. Gateway 124 may be a virtual appliance, a physical device, or a software module running within a host 105.

Similar to gateway 124, gateway 134 in datacenter 103 may provide hosts 135, VMs 130, and other components in datacenter 103 with connectivity to one or more networks used to communicate with one or more remote datacenters, such as datacenter 103. Gateway 134 may manage external public Internet Protocol (IP) addresses for VMs 130 and route traffic incoming to and outgoing from datacenter 103 and provide networking services, such as firewalls, NAT, DHCP, and load balancing. Gateway 134 may use data network 132 to transmit data network packets to hosts 135 or receive data packets from hosts 135. Gateway 134 may be a virtual appliance, a physical device, or a software module running within a host 135.

As shown in the figure the subnet address for data network 122 in datacenter 102 is 192.168.100.0/24, while the subnet address for data network 132 within datacenter 103 is 192.168.200.0/24. Additionally, the local IP address for VM $120_1$ (also referred as VM 120) in datacenter 102 is 192.168.100.2, while the local IP address for VM $130_1$ and VM $130_2$ in datacenter 103 are 192.168.200.2 and 192.168.200.3, respectively. Furthermore, as shown in the figure, the public IP address assigned to datacenter 102 by which other (external) network devices may access datacenter 102 is 100.100.100.100, while the public IP address assigned to datacenter 103 by which other (external) network devices may access datacenter 103 is 200.200.200.200.

Global manager 150, as described above, may communicate with local managers 128 and 138 to receive information required for direct communication between VMs 120 in datacenter 102 and VMs 130 in datacenter 103 from the local manager of each datacenter, and also deliver this information to the local manager of the other datacenter. For example, global manager 150 may receive the public IP address of datacenter 103 and local IP addresses of VMs $130_1$ and $130_2$ within datacenter 103, among other data, from local manager 138 and deliver this information to local manager 128 to configure gateway 124 and VM 120 with data necessary for a direct communication between VM 120 and VMs $130_1$ and $130_2$. Similarly, global manager 150 may receive the public IP address of datacenter 102 and local IP address of VM 120 within datacenter 102, among other data, from local manager 128 and deliver this information to local manager 138 to configure gateway 134 and VMs $130_1$ and $130_2$ with data necessary for the direct communication between VM 120 and VMs $130_1$ and $130_2$. For example, global manager 150 may configure gateways 124 and 134 with pairs of source-destination port numbers that are required to be inserted in the packet headers of the flows that are exchanged between each pair of EPs.

As an example, a destination gateway may be configured to identify packets of the flows that are exchanged directly between VM $120_1$ and VM $130_1$ based on the packet headers having X as their source port number. Similarly, packets of the flows that are directly exchanged between VM $120_1$ and VM $130_2$ may have a different source port number, such as Y, as the port number in their packet headers, and so on. This way, from the different source port numbers in the packet header, a destination gateway may determine different final destinations for two packets, even though other information in the packet headers, such as source and destination IP addresses and destination port numbers, can be the same. For example, when destination gateway 134 determines, during a DNAT process, that the source port number for a packet originated by VM $120_1$ is X, the gateway may identify VM $130_1$ as the final destination of the packet and subsequently change the destination IP address (and port number) in the packet header, for example, from the public IP address of datacenter 103, which is 200.200.200.200, to private IP address of VM $130_1$, which is 192.168.200.2. Conversely, if destination gateway 134 determines, during the DNAT process, that the source port number for a second packet originated by the same VM $120_1$ is Y, while the other identification data in the packet header might be the as the first packet, the gateway may identify VM $130_2$ as the final destination of the packet and subsequently replace the destination IP address (and port number) in the packet header with private IP address of VM $130_2$, which is 192.168.200.3.

In addition to source port numbers, other identification data (or tuples) in the packet headers may be used to identify the pair of VMs in some embodiments. For example, in some embodiments a pair of source-destination port numbers may be used for determining what EP in the destination site is the final destination for the packets. In some other embodiments, one or both of the source and destination IP addresses may also be used to identify the pair of VMs that are directly communicate with each other. This identification data may be configured in one or more tables that are stored at each gateway in some embodiments.

Global manager 150 may identify, and deliver to each local manager, other required information, such as port number reservations for one to one allocation for each pair of VMs, the MTU and/or MSS information (e.g., MTU/MSS of each VM may be shared with the gateway corresponding to the other VM), etc. Additionally, global manager 150 may push the VPN container configuration and container bring up details to local managers 128 and 138. Each local manager may then configure and provision the VMs with a container that has an appropriate VPN module along with the VPN configuration. An example of direct communications between a pair of VMs, such as VM 120 and VM 130, is described in detail below with reference to FIG. 4. It should be noted that in some embodiments, the global manager may configure the source and destination VMs with other configuration data and/or modules (e.g., besides VPN configuration/modules) to enable the containerized applications running in the VMs to directly communicate with each other.

Figure 2:
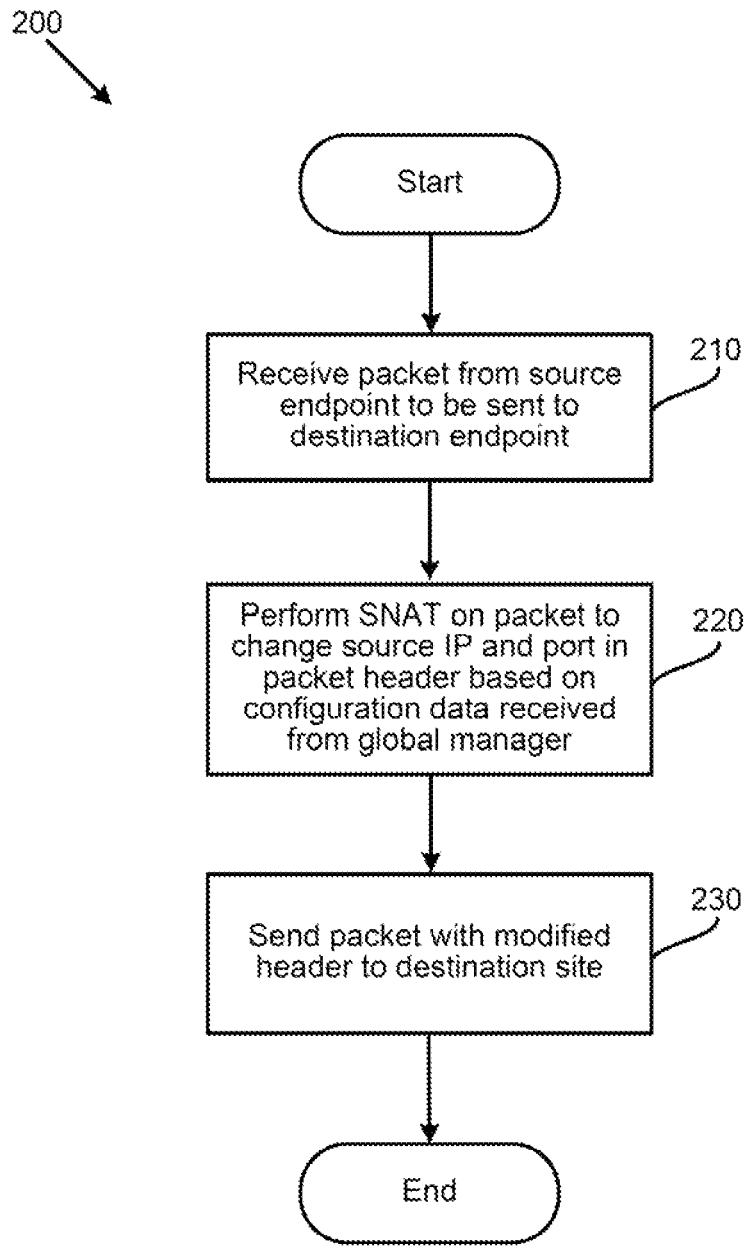
FIG. 2 is a flowchart illustrating an example process/method for performing an SNAT process at a network edge gateway of a source site for direct communication between two endpoints, according to an example embodiment of the present application.

FIG. 2 is a flowchart illustrating an example process/method 200 for performing an SNAT process at a network edge gateway of a source site for direct communication between two endpoints, according to an example embodiment of the present application. In some embodiments, process 200 may be performed by a gateway that is at a network edge of a source site, such as datacenter 102, as described above with reference to FIG. 1. In some other embodiments, the gateway may have been configured by a global manager, such as global manager 150, to perform process 200.

Process 200 may begin by receiving, at 210, a packet of a flow from a source endpoint that is destined for another endpoint located within a remote site at a different geographic location than the location of the site in which the gateway is located. The packet may be received from a source EP located within the site. Process 200 may perform an SNAT process on the packet based on the configuration received from a global manager before transmitting the packet out of the source site and toward the destination endpoint. For example, process 200 may perform, at 220, a SNAT process on the received packet to change the source IP address in the packet header to a public IP address of the source site (e.g., from the source IP address 192.168.100.2, which is the private IP address of VM $130_1$ to 100.100.100.100, as shown in FIG. 1). The SNAT process may further change the source port number of the header to a new source port number that is defined (e.g., by the global manager) as a source port number (e.g., from 500/4500 to 5000/5001) for a one on one communication between the source EP and a destination EP located in a remote site that has the public IP address, as indicated by the destination IP address in the packet header.

Figure 4:
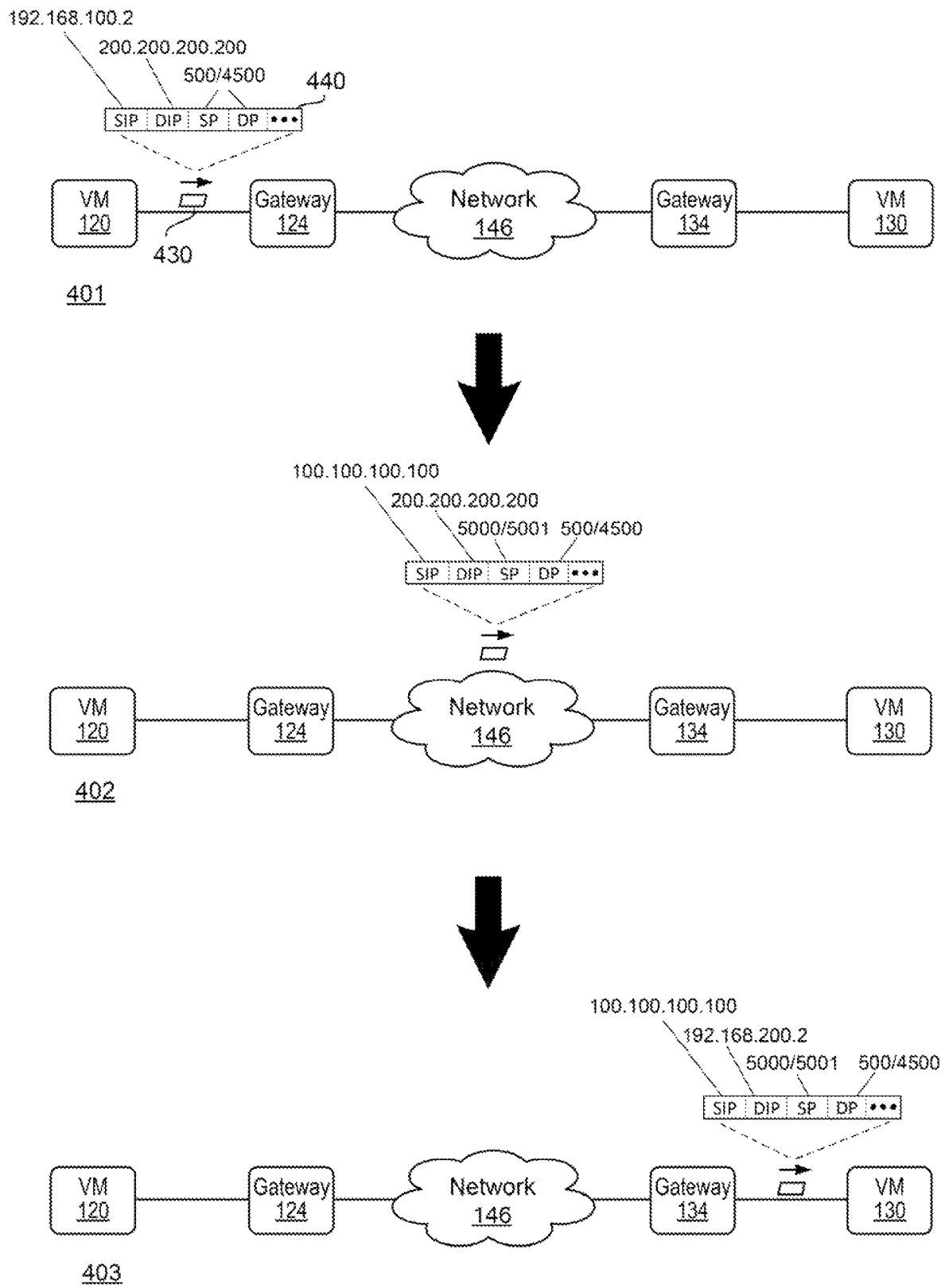
FIG. 4 is a block diagram illustrating, in three different stages, a direct communication between two endpoints across two remote sites, according to an example embodiment of the present application.

FIG. 4 is a block diagram illustrating in three stages 401-403 a direct communication between two endpoints across two remote sites, according to an example embodiment of the present application. At the first stage 401, source VM 120 (as shown in FIG. 1) sends a packet to source gateway 124 (as shown in FIG. 1). As shown in the figure, the header of packet 430 may include, among other data, a source IP address of 192.168.100.2, a destination IP address of 200.200.200.200, a source port number of 500/4500, and a destination port number of 500/4500. Packet 430 may also include data 440, as the payload of the packet. The source IP address is the local/private IP address of VM 120 in datacenter 102. The destination IP address is the public IP address of the destination site (e.g., datacenter 103, as shown in FIG. 1), which is, for example, configured to VM 120 by global manager 150 (e.g., through local manager 128). The source and destination port numbers may be fixed numbers defined by, for example, a NAT-T process when IPSec packets are encapsulated in UDP headers, as described above.

Stage 402 of FIG. 4 illustrates the changes in the header of packet 430 after gateway 124 performs an SNAT process on the packet. As shown in the figure, the SNAT process has changed the source IP address in the packet header to the public IP address of the source site (e.g., datacenter 102), which, in this example, is 100.100.100.100. The SNAT process has also changed the source port number to 5000/5001. As described above, this new source port number may have been configured at gateway 124 for any direct communication between VM $120_1$, as the source endpoint, and VM $130_1$, as the destination endpoint. As described above, if the packet was meant to be sent to a different VM in the destination site, such as VM $130_2$, since it may have been sent by a different source VM, the SNAT process may change the source port number in packet 430 to a different port number (e.g., 5002/5003), which is configured at the source gateway (e.g., by the global manager) for direct communication between the other source VM at the source site and VM $130_2$ in the destination site.

Returning to FIG. 2, after performing the SNAT process, at 230, process 200 may transmit the packet toward the destination endpoint (e.g., located within a remote destination site, such as destination datacenter 103, with reference to FIG. 1). The process may then end.

Figure 3:
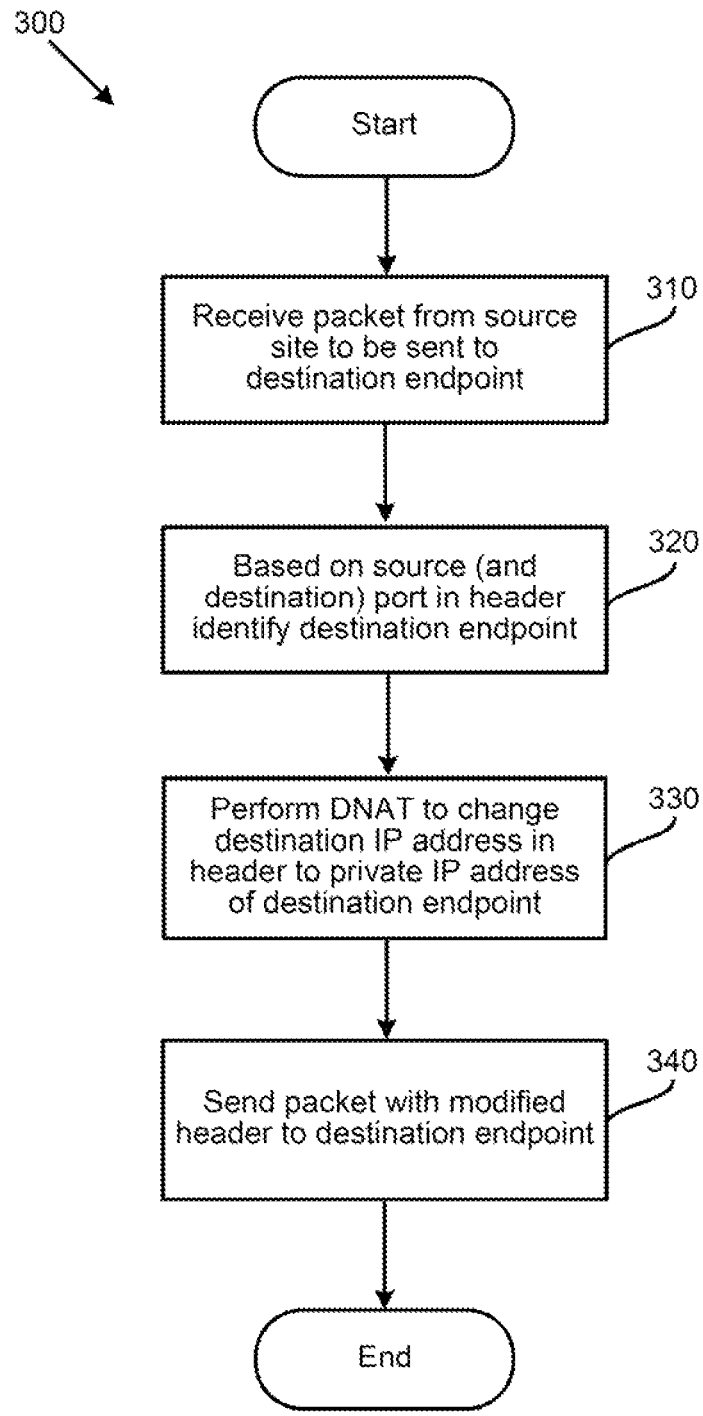
FIG. 3 is a flowchart illustrating an example process/method for performing a DNAT process at a network edge gateway of a destination site for direct communication between two endpoints, according to an example embodiment of the present application.

FIG. 3 is a flowchart illustrating an example process/method 300 for performing a DNAT process at a network edge gateway of a destination site for direct communication between two endpoints, according to an example embodiment of the present application. In some embodiments, process 300 may be performed by a gateway (e.g., gateway 134) that is at a network edge of a destination site, such as datacenter 103, as described above with reference to FIG. 1. In some embodiments, the gateway may have been configured by a global manager, such as global manager 150, to perform process 300.

Process 300 may begin by receiving, at 310, a packet of a flow from a source site that is destined for a local endpoint located within the site at which the destination gateway is located. The packet may be a packet on which a SNAT process is previously performed by a source gateway, as described above with reference to FIG. 2. Process 300 may identify, at 320, a local destination endpoint based on the configuration data received form the global manager and the source (e.g., and destination port) number in the packet header. For example the process may match the source port number in the packet header against a table that includes entries that map different source port numbers to different local destination IP addresses (e.g., and port numbers). In some embodiments, a source port number in each entry of such a table may additionally be mapped to the original source port number of the packet header. As described above, the identification of the final destination may be based on additional data in the packet header in some other embodiments. For example, the destination port number and/or source IP address in the packet header may be part of the identification data as well. As an example, some embodiments may use a combination of source IP address, source port number, and destination port number to identify the destination endpoint when there are multiple source sites from which the packet can be transmitted. In some other embodiments, the destination IP address in the packet may also be part of the identification data (e.g., in addition to source IP and source-destination port numbers).

After determining the final destination address, process 300 may perform a DNAT process on the packet to change the destination IP address (and port number) to the identified final destination IP address (and port number), which is associated with the destination endpoint. It should be noted that in some embodiments, operation 320 may be a part of the DNAT process described in operation 330. That is, in some such embodiments, operations 320 and 330 may be combined as one operation.

With reference to FIG. 4, stage 403 of this figure illustrates the changes in the header of packet 430 after destination gateway 134 performs a DNAT process on the packet and sends the packet toward its final destination, which is VM $130_1$. As shown in the figure, the DNAT process has changed the destination IP address in the packet header to the local/private IP address of destination VM $130_1$, which, in this example, is 192.168.200.2. As described above, if the source port number in packet 430 is a different port number (e.g., 5002/5003), the DNAT process may map this port number to a different destination VM (e.g., using the configuration tables), such as VM $130_2$, and replace the destination IP address with the local/private IP address of VM $130_2$.

Returning to FIG. 3, after performing the DNAT process, at 340, process 300 may transmit the packet toward the destination endpoint (e.g., located within the destination site). The process may then end.

Figure 5:
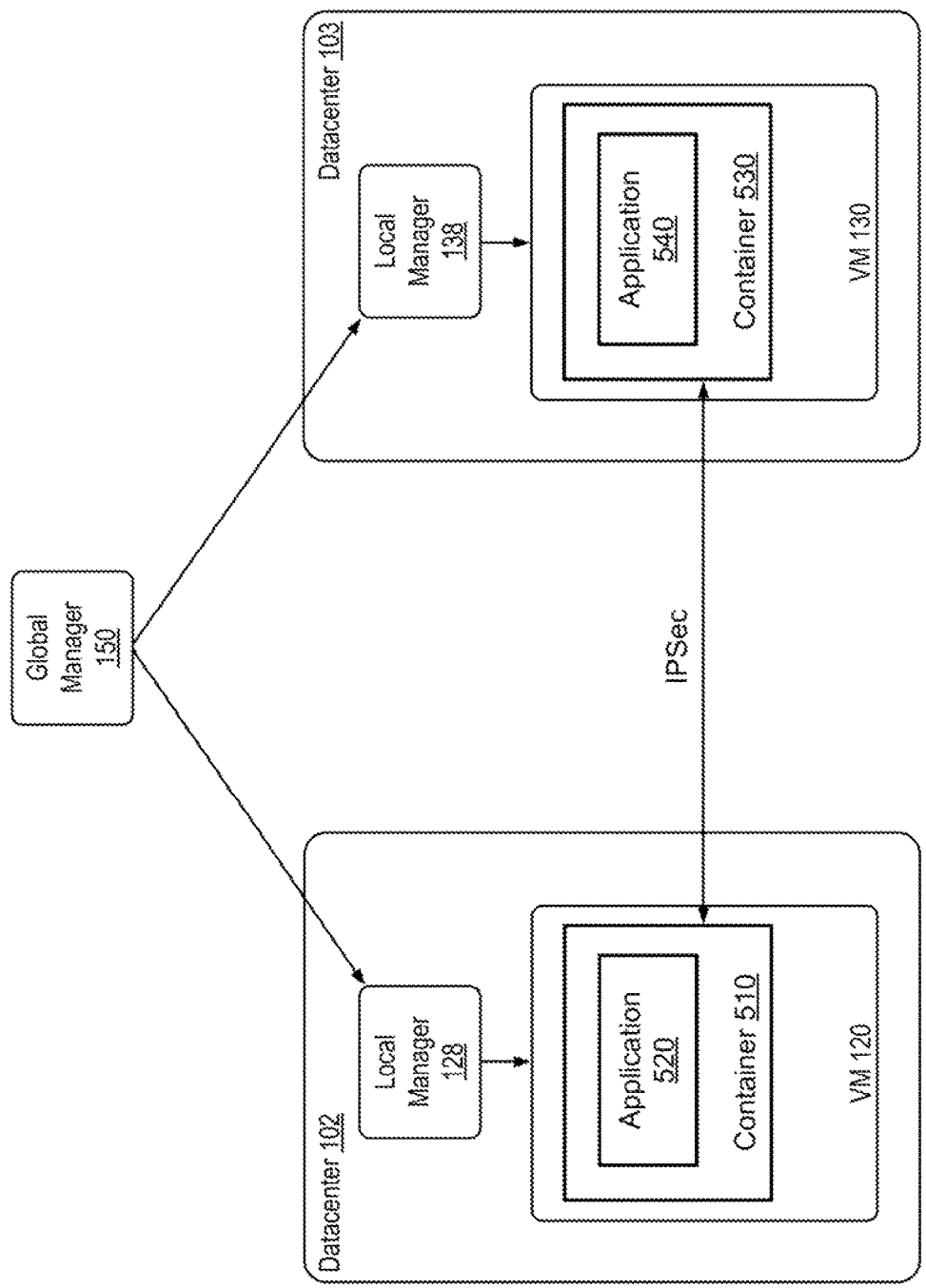
FIG. 5 is a block diagram illustrating two containers communicating with each other via a direct IPSec channel established between the containers, according to an example embodiment of the present application.

FIG. 5 is a block diagram 500 illustrating two containers (or containerized applications) communicating with each other via a direct IPSec channel established between the containers, according to an example embodiment of the present application. As shown in FIG. 5, application 520 within container 510 may be required to directly communicate with application 540 within container 530 through a secured channel. Container 510 is running on VM 120 located within datacenter 102 (as shown in FIG. 1), while container 530 is running on VM 130 located within datacenter 103. As described above, global manager 150 may push data required for such direct communication between containers 510 and 530 (or applications 520 and 540), to VMs 120 and 130, and gateways 124 and 134 (not shown in the figure) through their respective local managers of datacenters. The required data may include IPSec configuration data, tunneling data, local and remote IP addresses of the source and destination VMs, local and remote IDs of the source and destination VMs, etc. In some embodiments, VM 120 may provision a virtual private network (VPN) service on container 510 to enable container 510 to transmit data packets directly to container 530, for example, through a VPN tunnel. In some such embodiments, the VPN service may act as an initiator in VM 120 and as a responder in VM 130. In some other embodiments, VM 120 may configure/provision other services and/or IP protocols (e.g., other than VPN service) on container 510 to enable container 510 to transmit data packets directly to container 530.

In some embodiments, each of VMs 120 and 130 may act as a tunnel endpoint (e.g., using a tunneling module) or may be connected to a separate tunnel endpoint (TEP) (not shown in the figure) to communicate the IPSec traffic (or flows) with the other VM (or TEP). In some embodiments, VMs 120 and 130 may communicate with or transmit data packets to each other through tunnel endpoints (TEPs), for example, according to an IPSec protocol. VMs 120 and 130 (or TEPs) may implement different IPSec protocols, such as authentication header (AH) or, encapsulating security payload (ESP), to secure communication between one another. In some embodiments, before any data can be securely transferred between VMs 120 and 130 using the IPSec framework, the VMs may need to establish security associations (SAs) including a mutually agreed-upon key, one or more security protocols, etc., between themselves. In some embodiments, the security associations may be established by TEPs on behalf of VMs 120 and 130.

The mutually agreed-upon key (e.g., encryption/decryption key), in some embodiments, may be generated by the global manager and subsequently distributed to VMs 120 and 130 in some embodiments. After security associations have been established for the two VMs 120 and 130, one or more of these security protocols may be used to encrypt the packets at source VM 120 and decrypt the packets at destination VM 130. As described, in some embodiments, after the security associations between the VMs are established, source VM 120 may enable a NAT-T feature of the IPSec protocol to implement a UDP tunneling protocol for transmitting the IPSec packets to destination VM 130. In other words, by activating the NAT-T, the IPSec encrypted packets will be encapsulated by UDP headers to include the source and destination IPs of the respective source and destination VMs (or TEPs), and also source and destination ports (e.g., port numbers 500/4500).

In addition to acting as TEPs for containers 510 and 520 based on the configuration data received from global manager 150, each of the VMs 120 and 130 may also program and initiate its corresponding container (or containerized application) inside the VM based on the configured data received from global manager 150. As described above, configuring VMs 120 and 130 to start their respective containers 510 and 530 (or applications 520 and 540 within the containers) and performing the encryption and decryption of packets as the tunnel endpoints may substantially help in decentralizing the security process, for example, by offloading the process from the gateways to the individual VMs.

In host machine 105 (as shown in FIG. 1), processing unit(s) may retrieve instructions to execute and data to process in order to execute the processes discussed herein. The processing unit(s) may be a single processor or a multi-core processor in different embodiments. The read-only-memory (ROM) may store static data and instructions that may be utilized by the processing unit(s) and other modules of the electronic system. The permanent storage device, on the other hand, may be a read-and-write memory device. The permanent storage device may be a non-volatile memory unit that stores instructions and data even when the host machine is off. Some embodiments use a mass-storage device (such as a magnetic or optical disk and its corresponding disk drive) as the permanent storage device.

Some embodiments use a removable storage device (such as a flash drive, etc.) as the permanent storage device. Like permanent storage device, the system memory may be a read-and-write memory device. However, unlike permanent storage device, the system memory may be a volatile read-and-write memory, such as a random access memory (RAM). The system memory may store some of the instructions and data that processing unit(s) utilize at runtime. In some embodiments, processes discussed herein are stored in the system memory, the permanent storage device, and/or the read-only memory.

Certain embodiments, as described above, may involve a hardware abstraction layer on top of a host computer. The hardware abstraction layer allows multiple contexts or virtual computing instances to share the hardware resource. In some embodiments, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs.

It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for direct communication between a source endpoint executing in a first datacenter and destination endpoints executing in a second datacenter, comprising:
receiving, at a gateway of the second datacenter, a first packet sent by the source endpoint in the first datacenter, the first packet having a header comprising at least:
a source internet protocol (IP) address corresponding to a public IP address of the first datacenter;
a destination IP address corresponding to a public IP address of the second datacenter;
a first source port number; and
a destination port number;
performing, at the gateway of the second datacenter, a destination network address translation (DNAT) process on the first packet to replace at least the destination IP address in the header of the first packet with a private IP address of a first destination endpoint executing in the second datacenter, wherein the DNAT process identifies the private IP address of the first destination endpoint by mapping at least the first source port number and the destination port number in the header of the first packet to the private IP address of the first destination endpoint;
transmitting the first packet to the first destination endpoint in the second datacenter based on the private IP address of the first destination endpoint inserted in the header of the first packet;
receiving, at the gateway of the second datacenter, a second packet having a header comprising at least:
the source IP address corresponding to the public IP address of the first datacenter;
the destination IP address corresponding to the public IP address of the second datacenter;
the destination port number; and
a second source port number;
performing, at the gateway of the second datacenter, the DNAT process on the second packet to replace at least the destination IP address in the header of the second packet with a private IP address of a second destination endpoint executing in the second datacenter, wherein the DNAT process identifies the private IP address of the second destination endpoint by mapping at least the second source port number and the destination port number in the header of the second packet to the second private IP address of the second destination endpoint; and
transmitting the second packet to the second destination endpoint in the second datacenter based on the private IP address of the second destination endpoint inserted in the header of the second packet.

2. The method of claim 1, wherein the source endpoint comprises a first containerized application running in a first virtual machine of the first datacenter, and wherein the first destination endpoint comprises a second containerized application running in a second virtual machine of the second datacenter.

3. The method of claim 2, wherein a global manager configures (i) the first virtual machine and a gateway of the first datacenter through a local manager of the first datacenter, and (ii) the second virtual machine and the gateway of the second datacenter with data required to enable the first containerized application to transmit the first packet to the second containerized application.

4. The method of claim 1, wherein:
the mapping, in addition to the first source port number and the destination port number, maps the source IP address in the header of the first packet to the private IP address of the first destination endpoint; and
the mapping, in addition to the second source port number and the destination port number, maps the source IP address in the header of the second packet to the private IP address of the second destination endpoint.

5. The method of claim 1, wherein, before receiving the first packet, a gateway of the first datacenter performs a source network address translation (SNAT) process on the first packet to:
replace a private source IP address of the header and associated with the source endpoint with the source IP address corresponding to the public IP address of the first datacenter, and
replace an initial source port number of the header with a the first source port number that is used to identify the private IP address of the first destination endpoint.

6. The method of claim 1, wherein a global manager receives data from local managers of the first and second datacenters, the data comprising at least the public IP address of the first datacenter and the public IP address of the second datacenter, the private IP address of the first destination endpoint, the private IP address of the second destination endpoint, and a private IP address of the first source endpoint, wherein the global manager configures the gateway of the second datacenter with information needed for the mapping of the first source port number and the destination port numbers in the header of the first packet to the private IP address of the first destination endpoint, wherein the global manager further configures the gateway of the second datacenter with information needed for mapping of the second source port number and the destination port number in the header of the second packet to the private IP address of the second destination endpoint.

7. The method of claim 6, wherein the global manager further configures the source endpoint with the public IP address of the second datacenter so that the source endpoint uses the public IP address of the second datacenter as the destination IP address of the first packet and the second packet.

8. A non-transitory computer readable medium comprising instructions that, when executed by one or more processors of a computing system, cause the computing system to perform a method for direct communication between a source endpoint executing in a first datacenter and a destination endpoint executing in a second datacenter, the method comprising:
receiving, at a gateway of the second datacenter, a first packet sent by the source endpoint in the first datacenter, the first packet having a header comprising at least:
a source internet protocol (IP) address corresponding to a public IP address of the first datacenter;
a destination IP address corresponding to a public IP address of the second datacenter;
a first source port number; and
a destination port numbers;
performing, at the gateway of the second datacenter, a destination network address translation (DNAT) process on the first packet to replace at least the destination IP address in the header of the first packet with a private IP address of a first destination endpoint executing in the second datacenter, wherein the DNAT process identifies the private IP address of the first destination endpoint by mapping at least the first source port number and the destination port numbers in the header of the first packet to the private IP address of the first destination endpoint;

transmitting the first packet to the first destination endpoint in the second datacenter based on the private IP address of the first destination endpoint inserted in the header of the first packet;

receiving, at the gateway of the second datacenter, a second packet having a header comprising at least:
the source IP address corresponding to the public IP address of the first datacenter;
the destination IP address corresponding to the public IP address of the second datacenter;
the destination port number; and
a second source port number;

performing, at the gateway of the second datacenter, the DNAT process on the second packet to replace at least the destination IP address in the header of the second packet with a private IP address of a second destination endpoint executing in the second datacenter, wherein the DNAT process identifies the private IP address of the second destination endpoint by mapping at least the second source port number and the destination port number in the header of the second packet to the second private IP address of the second destination endpoint; and transmitting the second packet to the second destination endpoint in the second datacenter based on the private IP address of the second destination endpoint inserted in the header of the second packet.

9. The non-transitory computer readable medium of claim 8, wherein the source endpoint comprises a first containerized application running in a first virtual machine of the first datacenter, and wherein the first destination endpoint comprises a second containerized application running in a second virtual machine of the second datacenter.

10. The non-transitory computer readable medium of claim 9, wherein a global manager configures (i) the first virtual machine and a gateway of the first datacenter through a local manager of the first datacenter, and (ii) the second virtual machine and the gateway of the second datacenter with data required to enable the first containerized application to transmit the first packet to the second containerized application.

11. The non-transitory computer readable medium of claim 8, wherein:
the mapping, in addition to the first source port number and the destination port number, maps the source IP address in the header of the first packet to the private IP address of the first destination endpoint; and
the mapping, in addition to the second source port number and the destination port number, maps the source IP address in the header of the second packet to the private IP address of the second destination endpoint.

12. The non-transitory computer readable medium of claim 8, wherein, before receiving the first packet, a gateway of the first datacenter performs a source network address translation (SNAT) process on the first packet to:
replace a private source IP address of the header and associated with the source endpoint with the source IP address corresponding to the public IP address of the first datacenter, and
replace an initial source port number of the header with a the first source port number that is used to identify the private IP address of the first destination endpoint.

13. The non-transitory computer readable medium of claim 8, wherein a global manager receives data from local managers of the first and second datacenters, the data comprising at least the public IP address of the first datacenter and the public IP address of the second datacenter, the private IP address of the first destination endpoint, the private IP address of the second destination endpoint, and a private IP address of the source endpoint, wherein the global manager configures the gateway of the second datacenter with information needed for the mapping of the first source port number and the destination port numbers in the header of the first packet to the private IP address of the first destination endpoint, wherein the global manager configures the gateway of the second datacenter with information needed for mapping of the second source port number and the destination port number in the header of the second packet to the private IP address of the second destination endpoint.

14. The non-transitory computer readable medium of claim 13, wherein the global manager further configures the source endpoint with the public IP address of the second datacenter so that the source endpoint uses the public IP address of the second datacenter as the destination IP address of the first packet and the second packet.

15. A computer system, comprising:
a memory; and
at least one processor coupled to the memory, the processor being configured to:
receive, at a gateway of a second datacenter, a first packet sent by a source endpoint in a first datacenter, the first packet having a header comprising at least:
a source internet protocol (IP) address corresponding to a public IP address of the first datacenter;
a destination IP address corresponding to a public IP address of the second datacenter;
a first source port number; and
a destination port number;
perform a destination network address translation (DNAT) process on the first packet to replace at least the destination IP address in the header of the first packet with a private IP address of a first destination endpoint executing in the second datacenter, wherein the DNAT process identifies the private IP address of the first destination endpoint by mapping at least the first source port number and the destination port number in the header of the first packet to the private IP address of the first destination endpoint;
transmit the first packet to the first destination endpoint in the second datacenter based on the private IP address of the first destination endpoint inserted in the header of the first packet;
receive, at the gateway of the second datacenter, a second packet having a header comprising at least:
the source IP address corresponding to the public IP address of the first datacenter;
the destination IP address corresponding to the public IP address of the second datacenter;
the destination port number; and
a second source port number;
perform the DNAT process on the second packet to replace at least the destination IP address in the header of the second packet with a private IP address of a second destination endpoint executing in the second datacenter, wherein the DNAT process identifies the private IP address of the second destination endpoint by mapping at least the second source port number and the destination port number in the header of the second packet to the second private IP address of the second destination endpoint; and transmit the second packet to the second destination endpoint in the second datacenter based on the private IP address of the second destination endpoint inserted in the header of the second packet.

16. The computer system of claim 15, wherein the source endpoint comprises a first containerized application running in a first virtual machine of the first datacenter, and wherein the first destination endpoint comprises a second containerized application running in a second virtual machine of the second datacenter.

17. The computer system of claim 16, wherein a global manager configures (i) the first virtual machine and a gateway of the first datacenter through a local manager of the first datacenter, and (ii) the second virtual machine and the gateway of the second datacenter with data required to enable the first containerized application to transmit the first packet to the second containerized application.

* * * * *